United States Patent [19]
White

[11] Patent Number: 6,108,043
[45] Date of Patent: Aug. 22, 2000

[54] HORIZONTAL SYNC PULSE MINIMUM WIDTH LOGIC

[75] Inventor: Michael G. White, Deerfield, Ill.

[73] Assignee: Zenith Electronics Corporation, Glenview, Ill.

[21] Appl. No.: 08/735,855

[22] Filed: Oct. 23, 1996

[51] Int. Cl.[7] .................................................. H04N 5/08
[52] U.S. Cl. ............................................ 348/531; 348/521
[58] Field of Search .................................. 348/531, 525, 348/526, 527, 528, 529, 530, 536, 540, 521, 524, 500; H04N 5/10

[56] References Cited

U.S. PATENT DOCUMENTS

| | | | |
|---|---|---|---|
| 4,112,463 | 9/1978 | Kamin | 348/525 |
| 4,691,248 | 9/1987 | Nishimoto | 348/531 |
| 5,121,206 | 6/1992 | Shibayama et al. | 348/525 |
| 5,327,238 | 7/1994 | Chou | 348/473 |

*Primary Examiner*—Chris Grant

[57] ABSTRACT

A horizontal sync separator that is capable of operating with horizontal sync signals of differing durations. A monostable is operated by the leading inverted negative edge of the horizontal sync pulse and generates a minimum duration horizontal pulse. The minimum duration horizontal pulse is applied along with the inverted negative horizontal pulse to an OR gate which outputs the longer of the two pulses. The arrangement assures proper video clamping during the horizontal back porch interval.

8 Claims, 5 Drawing Sheets

FIG. 3 NORMAL HORIZONTAL SYNC

HORIZONTAL SYNC PULSE MINIMUM WIDTH LOGIC

CROSS-REFERENCE TO RELATED COPENDING APPLICATION

This application discloses subject matter claimed in copending application Ser. No. 08/735,615, filed Oct. 23, 1996, entitled HDTV COMPATIBLE VERTICAL SYNC SEPARATOR.

BACKGROUND OF THE INVENTION AND PRIOR ART

This invention relates generally to synchronizing (sync) signal separating circuits and specifically to such circuits that are adapted to process sync signals of differing characteristics such as those associated with NTSC signals, HDTV signals and various computer signals.

The rapid proliferation of video signals other than in the NTSC television format has highlighted a need for sync signal separating circuits that are capable of accommodating such signals that have differing characteristics. In general, digital processing sync separator circuits may readily be tailored to operate on the wide variety of sync signals available. However, many types of equipment, such as monitors and projection receivers use analog processing and the present invention is intended for use therein.

The recently adopted SMPTE (Society of Motion Picture and Television Engineers) standards for HDTV horizontal syncs in tri level form (−300 millivolts, +300 millivolts and 0 volts on all colors in a 1 volt analog RGB signal format). The positive and negative portions of the horizontal sync are of very short duration, on the order of 0.5 microseconds. As such, the timing of the positive portion of the horizontal sync pulse interferes with the normal operation of the analog receiver back-porch video clamp circuit. In order to operate properly, the receiver must use the leading edge of the negative portion of the horizontal sync as a timing reference and ignore the positive portion entirely. Further, the receiver must be capable of operating with computer syncs which provide a negative going sync-on-green pulse and with standard NTSC syncs which have a much longer duration.

Another feature of the HDTV standard signal that creates a problem is the 33 KHz interlaced format vertical sync interval. NTSC and computer signals with composite interlaced sync include a series of double horizontal frequency equalizing pulses that occur for several lines before, during and after the vertical sync pulse. The 2H (twice horizontal frequency) equalizing pulses equalize the energy in the R-C integrator (a low pass filter) portion of the typical analog vertical sync separator circuit. If a composite interlaced sync pulse without 2H equalizing pulses both before and during the vertical sync interval is applied to such a circuit, the amount of energy in the R-C integrator will be slightly different in each of the two fields, resulting in distorted interlaced performance. The distortion results in "pairing" of the lines in the even and odd fields and is not acceptable, especially in high resolution monitors and large screen projection receivers.

The 33 KHz HDTV signal has 2H equalizing pulses only during the vertical sync pulse and not before and poses a problem. Further, there is a form of computer sync, referred to as OR'd composite sync, where the vertical pulse is not serrated by either 1H or 2H pulses.

The present invention is concerned with the solution to the horizontal sync problem and the invention in the above-mentioned copending application is concerned with the solution to the vertical problem. It will be appreciated that both inventions may be used in the same receiver as well as individually.

OBJECTS OF THE INVENTION

A principal object of the invention is to provide a novel sync separator circuit.

Another object of the invention is to provide a sync separator circuit that is useful with sync signals of varying characteristics.

A further object of the invention is to provide a novel horizontal sync separator circuit.

BRIEF DESCRIPTION OF THE DRAWINGS

These and other objects and advantages of the invention will be apparent from reading the following description thereof in conjunction with the drawings, in which.

DESCRIPTION OF THE PREFERRED EMBODIMENT

Figure 1:
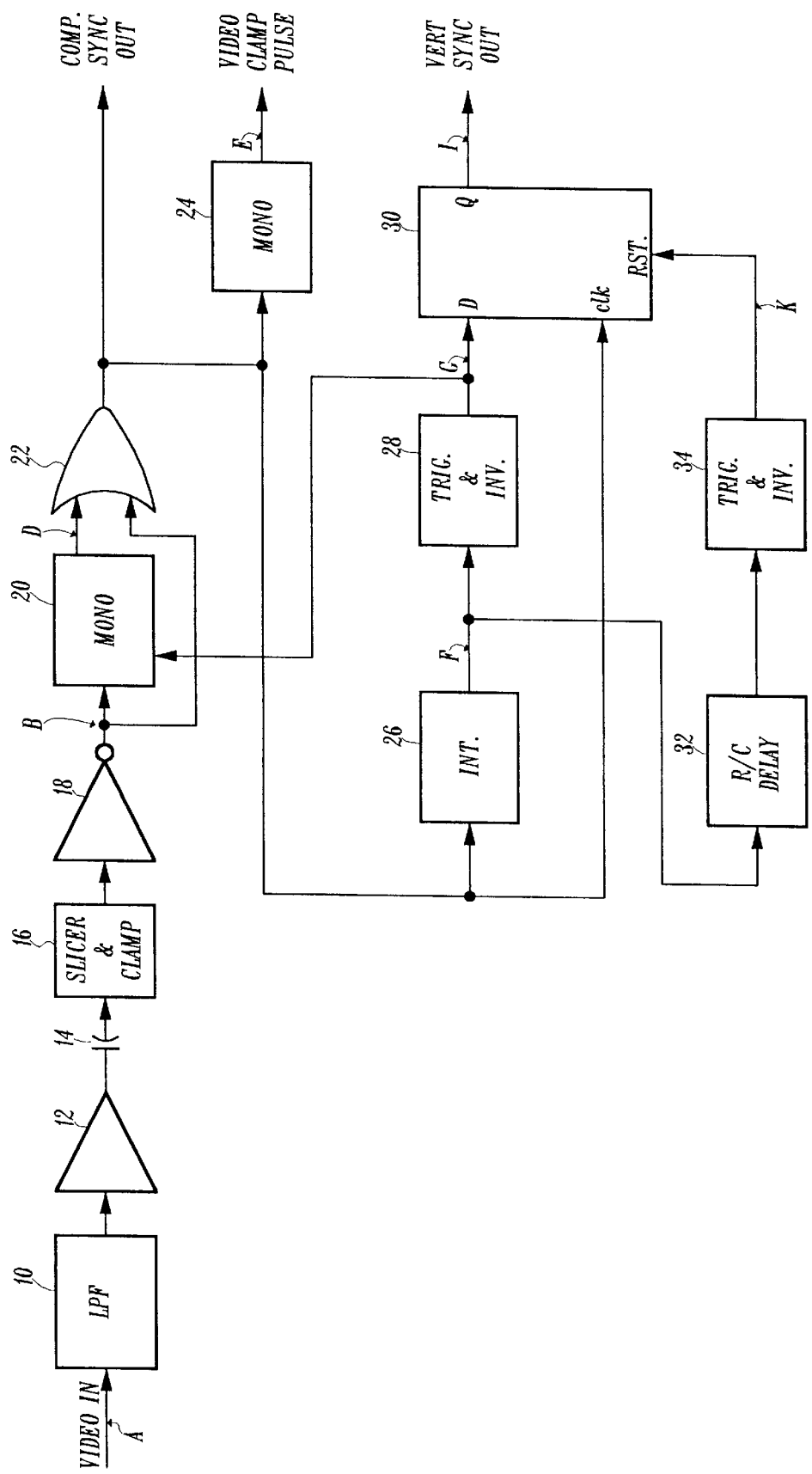
FIG. 1 is a simplified schematic diagram of a sync separator circuit incorporating both the horizontal and vertical aspects of the invention.

The various waveforms in the figures are labelled with letters corresponding to the lettered points on the schematic diagram of FIG. 1 for aiding in understanding the operation of the invention.

Referring to FIG. 1, a source of video signal, which is preferably the G (green) video signal in an RGB system, applies a video input signal (A) to a low pass filter 10. The output of the low pass filter is supplied to a buffer 12 and thence, through a capacitor 14, to a slicer and clamp circuit 16. The operation of the circuit 16 serves to clamp the negative portion of the composite (horizontal and vertical) sync and to slice it at a level above the clamp reference. This technique is old in the art and is not a part of the invention. The sliced, negative going sync is supplied to an inverter 18 where it is converted to a positive going signal (B). The output of inverter 18 is applied to the input of a monostable multivibrator 20 and to one input of an OR gate 22. Monostable 20 outputs a fixed duration, fixed level, positive going minimum width horizontal sync pulse (D) to the other input of OR 22. The composite sync is taken from the output of OR 22 and is applied to another monostable multivibrator 24, which develops a video clamp pulse (E), and to the input of a vertical integrator 26 and to the clock input of a D type flip/flop 30. The output (F) of integrator 26 is supplied to a trigger/inverter circuit 28 and to an R/C delay circuit 32. The output of trigger/inverter circuit 28 (G) is coupled to the D input of flip/flop 30. Delay circuit 32 supplies another trigger/inverter circuit 34 that, in turn, couples its output signal (K) to the reset input of flip/flop 30. The Q output of flip/flop 30 supplies the vertical sync output signal (I). Lastly, the output of trigger circuit 28 is coupled to inhibit monostable multivibrator 20 during the vertical pulse to obviate the possibility of false triggering.

Figure 2:
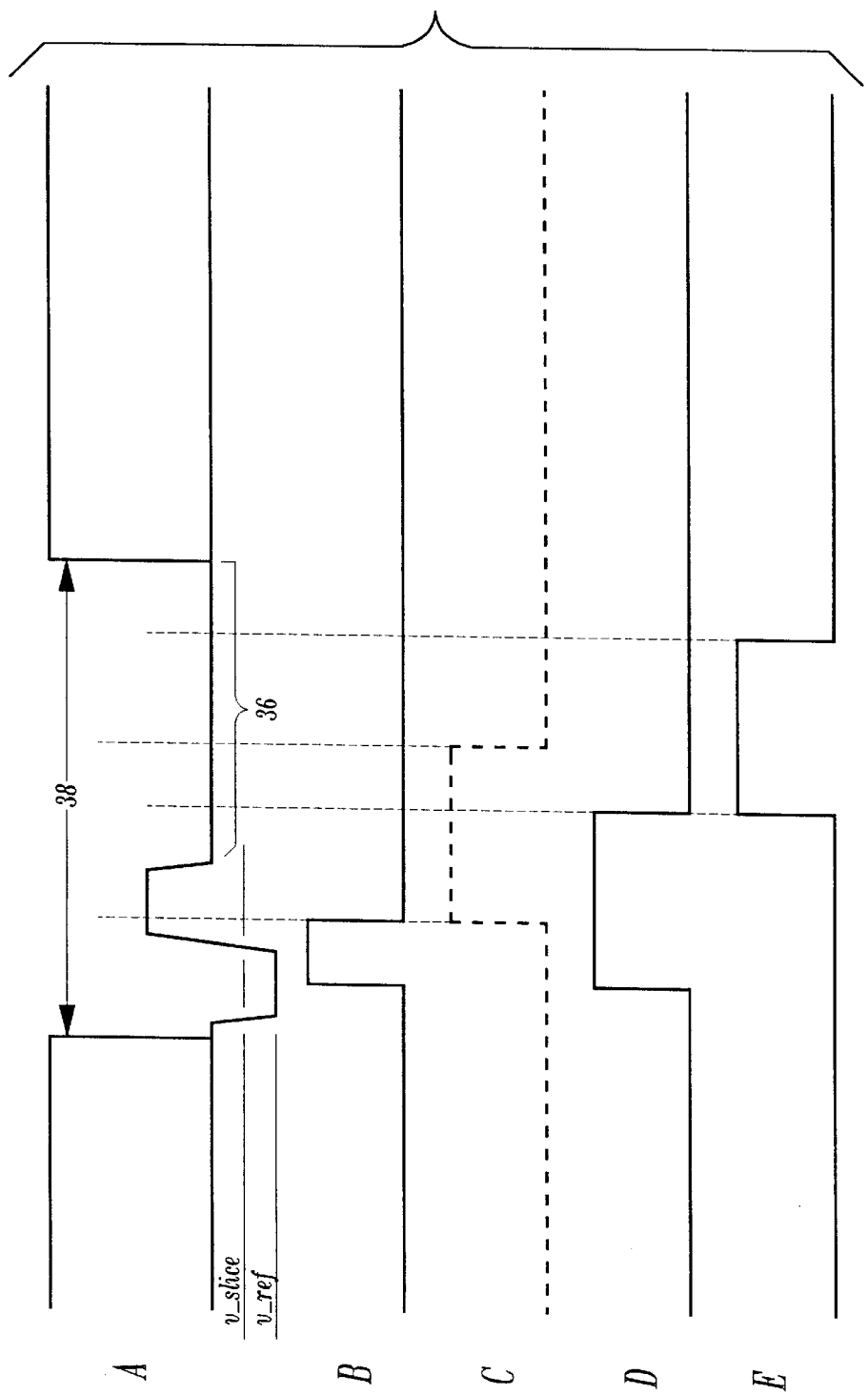
FIG. 2 is a series of waveforms illustrating operation of the sync separator with HDTV horizontal sync.
Figure 3:
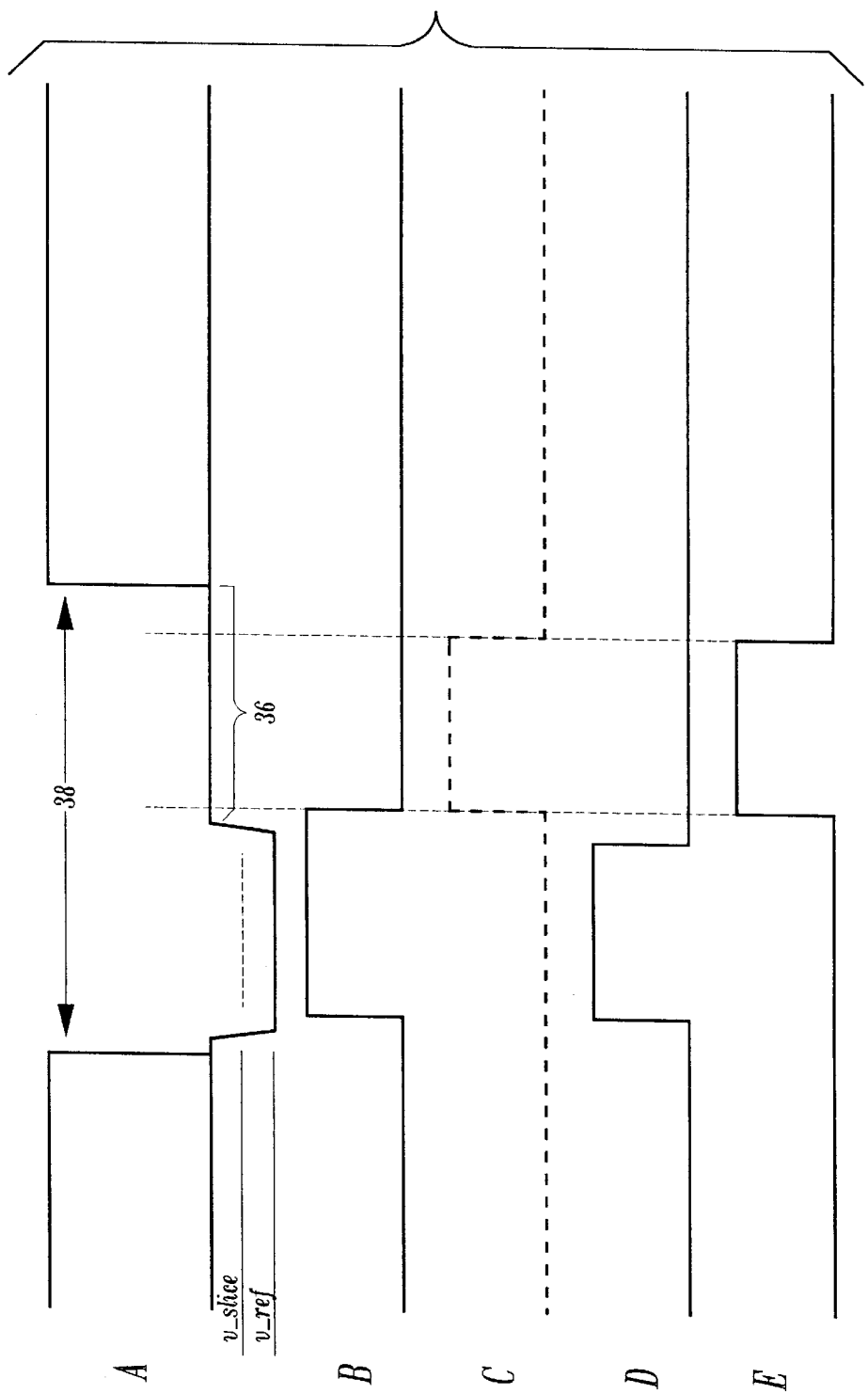
FIG. 3 is a series of waveforms illustrating operation of the horizontal sync separator for normal width horizontal sync.

The two monostable multivibrators are conveniently arranged in the same circuit package and function to deliver a 1.1 microseconds pulse in response to the rising edge of a signal at their inputs. Thus, as is seen in FIGS. 2 and 3, the minimum width horizontal sync pulse (D) from monostable 20 is generated at the rising (leading) edge of the inverted negative portion (B) of the horizontal sync (A). The longer of the minimum width horizontal pulse and the normal horizontal sync in the received signal is passed to monostable 24, integrator 26 and the clock input of flip/flop 30. As seen in FIGS. 2 and 3, the video clamp pulse (E) is generated by monostable 24 at the end of the longer of the minimum width horizontal pulse and the normal horizontal sync. In both cases (HDTV sync of FIG. 2 and normal sync of FIG. 3), the video clamp pulse (E) occurs during the back porch 36 of the horizontal interval 38, which enables consistent clamping.

Figure 4:
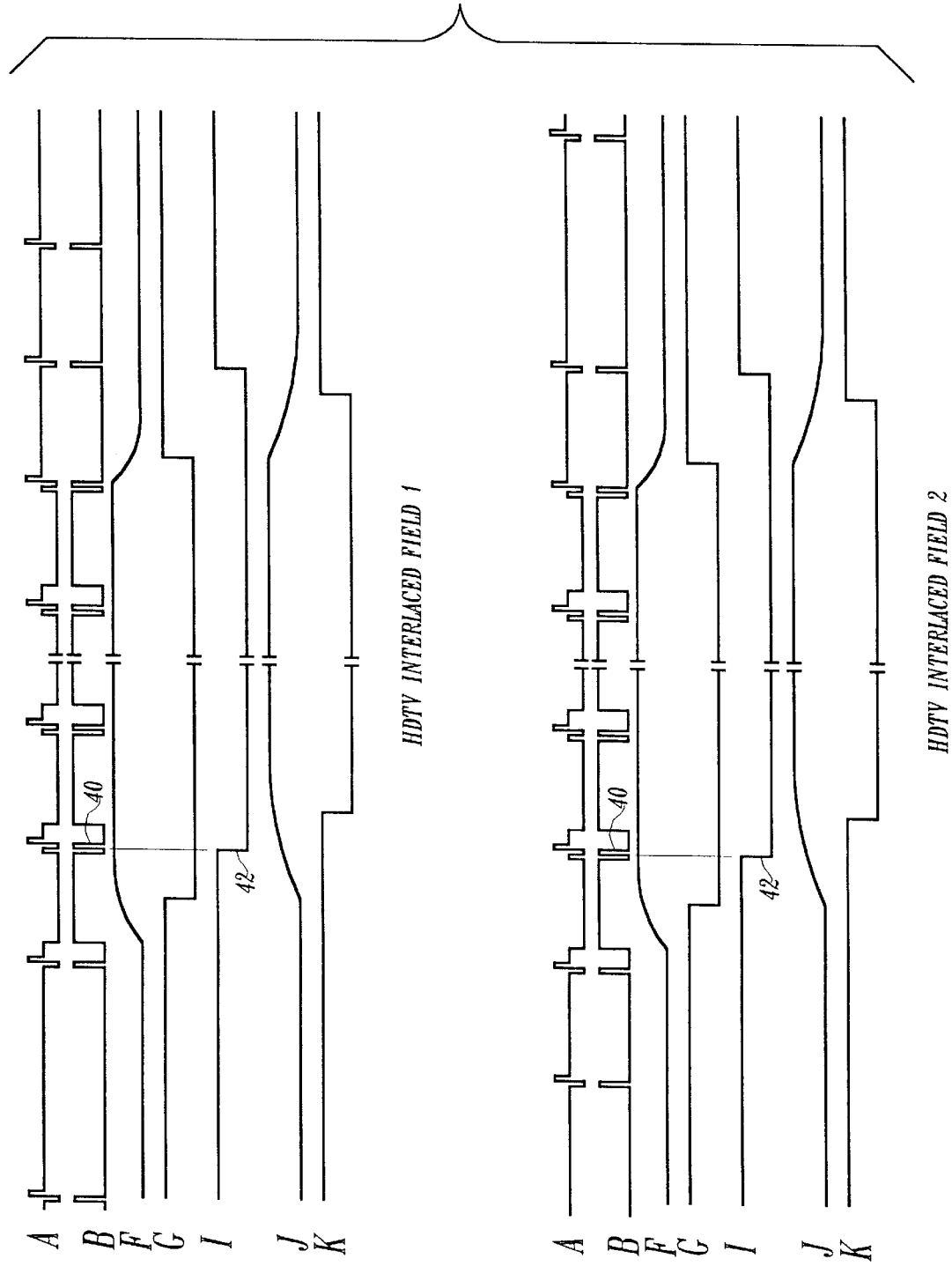
FIG. 4 is a series of waveforms illustrating operation of the vertical sync separator for HDTV vertical syncs.

The vertical sync separator portion of the circuit of FIG. 1 accepts the separated composite sync output and integrates it in vertical integrator 26. The integrator output is supplied to a Schmidt trigger/inverter 28 which squares up the output. The components of the vertical integrator comprise a two-pole low pass filter that imparts a delay of less than one-half line at 33 KHz to the vertical sync pulse. The input from the horizontal minimum pulse width logic circuit is also applied to the clock input of the flip/flop 30 and serves to clock through the signal from the trigger/inverter 28. For the 33 KHz HDTV signal, the rising edges of the 2H horizontal equalizing pulses do the clocking. Since the data input signal at the D terminal of the flip/flop is delayed by less than one-half line, as seen in FIG. 4, the clocked vertical sync output (I) always goes low 42 coincident with the rising edge of the first equalizing pulse 40 after the start of the vertical sync pulse (I). This result is consistent from field to field and therefore the leading edge of the vertical sync output pulse (I) preserves accurate interlace timing.

It will be appreciated that the delay circuit 32 and trigger/inverter 34 have no effect on the operation of the vertical sync separator when HDTV signals are received. As indicated by waveforms (J) and (K), the reset of the flip/flop 30 occurs after the clocking of its data input and doesn't affect the vertical output sync signal (I).

Figure 5:
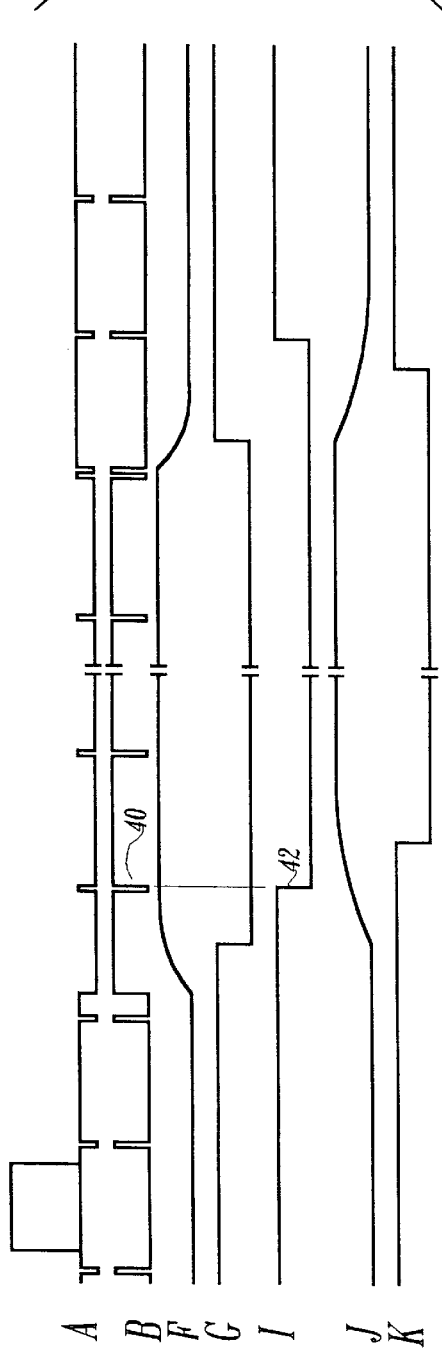
FIG. 5 is a series of waveforms illustrating operation of the vertical sync circuit for normal and computer composite sync.

In FIG. 5, the normal/computer composite sync waveforms for the vertical sync separator are shown. While only 1H equalizing pulses are indicated, those skilled in the art will appreciate that the circuit will operate similarly with 2H equalizing pulses as actually occur in a normal composite sync signal. Here again, the vertical output sync signal (I) is clocked by the rising edge of the first equalizing pulse occurring after the beginning of the vertical pulse. Also, the contributions of delay circuit 32 and trigger/inverter 34 do not affect the development of the vertical output sync pulse (I).

Figure 6:
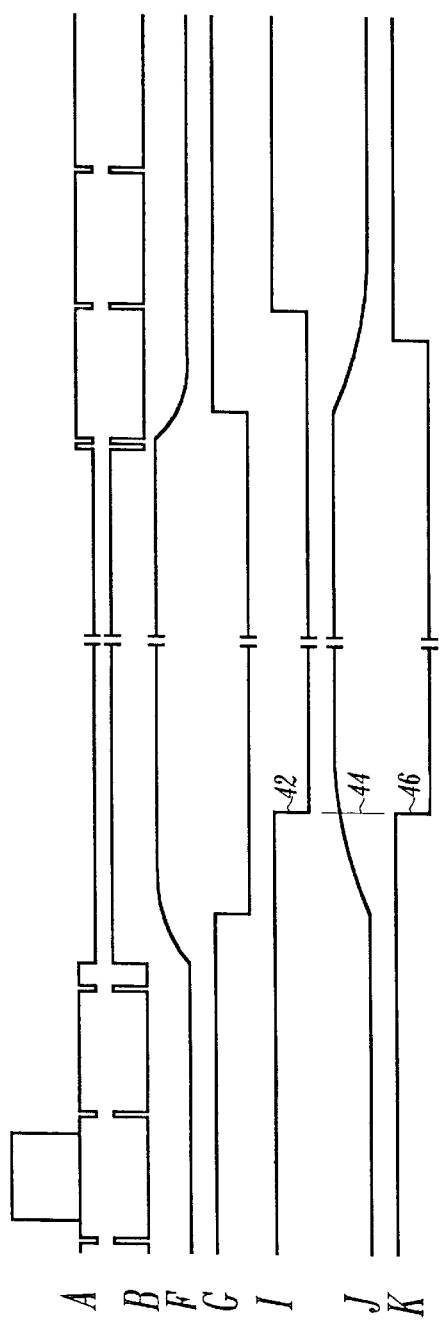
FIG. 6 is a series of waveforms illustrating operation of the vertical sync separator for computer OR'd sync.

In FIG. 6, the computer OR'd case is shown where there are no equalizing pulses in the vertical pulse. In this instance, triggering of the flip/flop 30 to generate the vertical output sync pulse (I) occurs by operation of the Schmidt trigger/inverter 34 resetting the flip/flop in response to the integrated waveform (J). This is illustrated by point 44 on waveform (J), the beginning 46 of the reset signal to the flip/flop and the leading edge 42 of the vertical sync output pulse (I). In these vertical cases, the vertical sync output pulse is terminated by clocking the output (G) of trigger/inverter 28 through flip/flop 30 by the first horizontal pulse following the rising edge of the reset signal (K). In a conventional analog receiver implementation, the placement and consistency of this edge is relatively unimportant, since the vertical circuits trigger off of the leading edge of the vertical sync output pulse (I).

What has been described is a novel sync separator arrangement that is capable of operating on a variety of sync signal formats. It is recognized that numerous departures from the described embodiment of the invention will occur to those skilled in the art without departing from its true spirit and scope. The invention is to be limited only as defined in the claims.

What is claimed is:

1. A method of processing video signals including horizontal sync pulses of varying widths comprising:

separating the sync pulses;

developing minimum width sync pulses from the separated sync pulses; and generating video clamp pulses from the longer of the minimum width sync pulses and the separated sync pulses.

2. The method of claim 1, wherein the developing comprises:

supplying the separated sync pulses to a monostable multivibrator and further including:

supplying the minimum width sync pulses and the separated sync pulses to an OR gate.

3. The method of claim 2, wherein the horizontal sync pulses include HDTV sync pulses having approximately 0.5 microseconds portions and NTSC sync pulses having an approximately 4.5 microseconds portions and wherein the monostable multivibrator has a timing period of approximately 1.1 microseconds.

4. A method of processing HDTV and NTSC signals having horizontal sync pulses with approximately 0.5 microseconds portions and 4.5 microseconds portions, respectively, comprising:

separating the sync pulses;

supplying the separated sync pulses to a monostable multivibrator having a timing period of approximately 1.1 microseconds duration to produce minimum width sync pulses;

supplying the minimum width sync pulses and the separated sync pulses to an OR gate; and developing a video clamp signal from the output of the OR gate.

5. Apparatus for processing video signals including horizontal sync pulses of varying widths comprising:

means for separating said sync pulses;

means for developing minimum width sync pulses from said separated sync pulses; and means for generating a video clamp signal from the longer of said minimum width sync pulses and said separated sync pulses.

6. The apparatus of claim 5, wherein said developing means comprise:

means for supplying said separated sync pulses to a monostable multivibrator and further including:

means for supplying said minimum width sync pulses and said separated sync pulses to an OR gate.

7. The apparatus of claim 6, wherein said horizontal sync pulses include HDTV sync pulses having approximately 0.5 microseconds portions and NTSC sync pulses having an approximately 4.5 microseconds portion and wherein said monostable multivibrator has a timing period of approximately 1.1 microseconds.

8. Apparatus for processing HDTV and NTSC signals having horizontal sync pulses with approximately 0.5 microseconds portions and 4.5 microseconds portions, respectively, comprising:

means for separating said sync pulses;

a monostable multivibrator having a timing period of approximately 1.1 microseconds duration;

means for supplying said separated sync pulses to said monostable multivibrator to produce minimum width sync pulses;

an OR gate;

means for supplying said minimum width sync pulses and said separated sync pulses to said OR gate; and means for developing a video clamp signal from the output of said OR gate.

* * * * *